United States Patent [19]

Molotsky

[11] Patent Number: 4,585,858

[45] Date of Patent: Apr. 29, 1986

[54] STARCH-BASED POLYETHER POLYOLS

[75] Inventor: Hyman M. Molotsky, Chicago, Ill.

[73] Assignee: CPC International Inc., Englewood Cliffs, N.J.

[21] Appl. No.: 105,684

[22] Filed: Jan. 11, 1971

Related U.S. Application Data

[63] Continuation-in-part of Ser. No. 606,596, Jan. 3, 1967, abandoned.

[51] Int. Cl.⁴ ............................................. C07H 15/08
[52] U.S. Cl. .................... 536/4.1; 536/18.3; 536/102; 536/103; 536/111; 536/120
[58] Field of Search ............... 536/102, 103, 4.1, 120, 536/18.3, 111

[56] References Cited

U.S. PATENT DOCUMENTS

| | | | |
|---|---|---|---|
| 2,733,238 | 1/1956 | Kerr et al. | 260/233.3 R |
| 2,902,478 | 9/1959 | Anderson | 260/209 R |
| 3,165,508 | 1/1965 | Otey et al. | 260/209 R |
| 3,190,927 | 6/1965 | Patton, Jr. et al. | 260/209 R |
| 3,317,508 | 5/1967 | Winquist, Jr. et al. | 260/209 R |
| 3,346,557 | 10/1967 | Patton, Jr. et al. | 260/209 R |
| 3,369,014 | 2/1968 | Booth | 260/209 R |
| 3,370,056 | 2/1968 | Yotsuzuka et al. | 260/209 R |
| 3,402,170 | 9/1968 | Fuzesi et al. | 260/233.3 R |
| 3,414,530 | 12/1968 | Zilkha et al. | 260/233.3 R |
| 3,442,888 | 5/1969 | Degginger et al. | 260/209 R |

Primary Examiner—Johnnie R. Brown

[57] ABSTRACT

This application discloses polyether products of starch with several different etherifying agents, preferably the alkylene oxides, where the moles of etherifying agent per anhydroglucose unit are in the range from about 3.5 to about 50. Also disclosed are the hydrolyzates of the starch polyethers. Methods of producing the starch polyethers by base-catalyzed reactions are also described. Several applications for the polyether products are described, including rigid and flexible polyurethane foams, film-forming compositions, and foundry resin binders.

11 Claims, No Drawings

STARCH-BASED POLYETHER POLYOLS

This application is a continuation-in-part of my earlier, patent application, Ser. No. 606,596, filed Jan. 3, 1967, now abandoned, entitled STARCH POLYETHERS AND PROCESSES FOR PRODUCING THEM.

This invention relates to new starch derivatives and their production. More particularly, it relates to new polyethers of starch, their hydrolysis products, and to methods for producing them.

Starch is a potentially inexpensive polyol material for a number of commercial applications, particularly those demanding high molecular weights. One object of the present invention is to provide new polyethers of starch, their hydrolysis products, and new practical processes for their production.

Another object of this invention is to provide novel starch polyethers that have high molecular weights, and, as well, practical, efficient processes for their production.

A more general object of the invention is to provide a relatively simple, practical, economical process for modifying starch chemically, so as to make products that are suitable and attractive for several commercially important applications.

A more specific object of the invention is to provide novel alkoxylated starch products, that have physical properties that make attractive their use in many commercial applications, and practical ways of producing these products.

Other objects of the invention will be apparent hereinafter from the specification and the recitals of the appended claims.

The process for producing these products may be briefly exemplified as follows. Starch is reacted, preferably in an inert solvent, with an alkylene oxide in an autoclave in the presence of an alkaline catalyst at temperatures in the range from about 50° C. (122° F.) up to about 200° C. (392° F.) and at a pressure of at least 30 psi up to a practical maximum that generally will not exceed about 115 psi. The reaction is carried out for a sufficient period of time so that the reaction products obtained are polyethers having an average M.S. of about 3.5 to about 50 or more (the term M.S. is used to denote the moles of alkylene oxide per anhydroglucose unit). Following the reaction, the catalyst may be optionally neutralized, as by an acid addition, and the polyether product is then recovered.

The polyether products can be hydrolyzed, if desired, to produce the hydrolysis products of this invention. One way to hydrolyze the polyether products involves refluxing with mineral acid, then neutralizing the acid or removing the acid with anion exchange resins. Another method would be to reflux the starch polyether with a cation exchange resin.

The starch polyether products of this invention may be characterized by the following general formula, in which x stands for the number of repeating anhydroglucose units in the starch molecule, which may range from as few as about 100 to as many as several thousand:

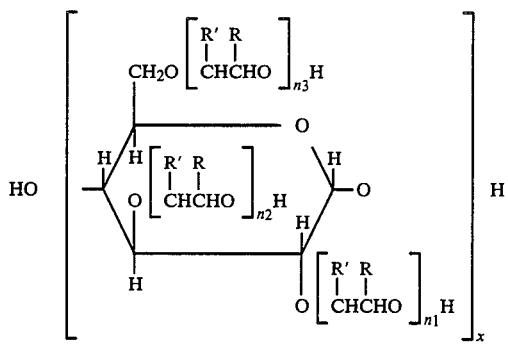

where R and R' can be different or the same, and may be H, $CH_3$, $C_2H_5$, $C_3H_7$, $CH_2CH_2Cl$, $CH_2CH_2Br$, $CH_2OH$, $CH=CH_2$, and aryl groups; and where $n_1$, $n_2$, and $n_3$ are whole numbers from 0 up to about 50, and the average of the sun of $n_1$, $n_2$, and $n_3$ is in the range of about 3.5 to about 50, depending on the number of alkylene oxide groups introduced.

The starch polyethers of this invention may also be represented by the following formula:

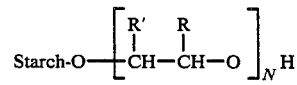

where N has a value in the range from about 3.5 to about 50, per average anhydroglucose unit, and R' and R have the meanings given above.

As is known, the anhydroglucose unit, of the type which is present in the starch, may have various degrees of substitution (D.S.) of from less than one up to the maximum level of three. According to present beliefs in the art, the 6 position hydroxyl in any anhydroglucose unit is the most reactive. Further, the hydroxyl at the 2 position is believed to be the next most reactive, and the hydroxyl at the 3 position is believed to be the least reactive. The present belief of the art further supposes that the 6 position hydroxyls in the anhydroglucose units will undergo a more extensive substitution or addition than the hydroxyls at the 2 and 3 positions, but it may be otherwise. Irrespective of the actual sequence or the number of anhydroglucose units involved, the general formula immediately above is intended to represent the products of this invention wherein the ether substitution may occur to various degrees of substitution at all or less than all of the anhydroglucose units in the starch. In the formula immediately above, the group within the bracket may be repeatedly added to obtain the various polyether products of this invention, where N is a number of from about 3.5 to about 50. This concept of molar substitution (M.S.) conveniently expresses the moles of alkylene oxide that are added to the average anhydroglucose unit in the starch. A number that is fractional reflects the fact that the M.S. figure represents a statistical average.

The completely hydrolyzed starch polyether products of this invention may be characterized by the following general formula:

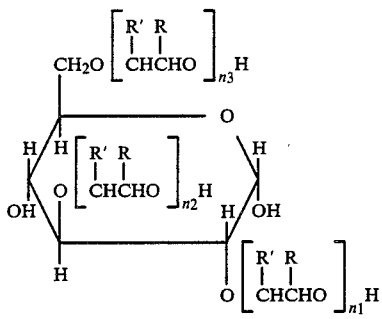

where R and R' can be different or the same, and may be H, $CH_3$, $C_2H_5$, $C_3H_7$, $CH_2CH_2Cl$, $CH_2CH_2Br$, $CH_2OH$, $CH=CH_2$, and aryl groups; and where $n_1$, $n_2$, and $n_3$ are whole numbers from 0 up to about 50, and the average of the sum of $n_1$, $n_2$, and $n_3$ is in the range of about 3.5 to about 50 per anhydroglucose unit, depending on the number of alkylene oxide groups introduced.

The starch polyethers of the invention are colloidal in nature. They are generally soluble in cold water and in non-polar solvents. The higher M.S. products are generally insoluble in hot water. The starch polyethers and their hydrolysis products which have been reacted with ethylene oxide are soluble in hot water.

The starch used in practicing the invention may be derived from any vegetable source, such as corn, wheat, potato, tapioca, rice, sago, grain sorghum and waxy starches. The term "starch" as used broadly herein, encompasses unmodified starch and tailings and starch which has been modified by treatment with acids, alkalis, enzymes or oxidizing agents. Soluble or partially soluble modified starches, dextrins, pregelatinized products and starch derivatives are also suitable for use in our process.

In general, high fluidity starches are particularly suitable for use. (Fluidity is calculated from Scott viscosity data using the expression:

$$\text{Fluidity} = \frac{2000}{\text{Scott test value}}$$

where 28.35 g. of starch is cooked in 280 ml. of water. See Kerr, CHEMISTRY AND INDUSTRY OF STARCH, 2nd edition, Academic Press, 1950, p. 133-134.)

The starch may contain some moisture, such as, for example, 12% $H_2O$, which is well within the nominally "dry" starch of 10%-20% $H_2O$. A small amount of glycerin or of free water, such as 5% to 10% based on the weight of starch, may be tolerated in the reaction mixture without adverse effect.

The preferred lower aliphatic alkylene oxides employed in the process of the invention are ethylene oxide or propylene oxide, although other alkylene oxides containing 2 to 5 carbon atoms can be employed, such as, for example, butylene oxide, amylene oxide, epihalohydrin (halopropylene oxide), glycidol (hydroxypropylene oxide) and its derivatives, butadiene monoxide, and the like, and any mixtures of the above compounds. Other oxides suitable for the invention are aromatic oxides, such as styrene oxides and derivatives thereof.

The reaction medium is an inert solvent material, preferably a material such as xylene, toluene, benzene, or dioxane and/or excess alkylene oxide as a reactive solvent. Glycerin and aminoethanol can also be used as reactive solvents. Urea, thiourea, melamine, guanidine and triazine and the like can be used as co-reactants. The monofunctional alcohols, such as methanol, ethanol, and isopropanol, and water, should be excluded, as far as practicable, since they produce nondesirable by-products.

The process of the invention is base catalyzed. Potassium hydroxide is the preferred catalyst, however, basic amine catalysts could be used as well as other basic hydroxides, such as sodium hydroxide or calcium hydroxide. The amount of alkaline catalyst generally ranges from 1% to 7% based on the weight of starch.

Temperatures employed in the process of this invention are in the range of from about 50° C. (122° F.) up to about 200° C. (392° F.), preferably 100° C. (212° F.) up to about 175° C. (347° F.). However, when using ethylene oxide as the etherifying agent, lower temperatures, such as 50° C. (122° F.) up to about 130° C. (266° F.) are preferred.

The amount of etherifying agent used depends primarily upon the moles of alkylene oxide desired per anhydroglucose unit in the final product. We have used sufficient alkylene oxide to produce polyethers having a M.S. (moles of alkylene oxide per anhydroglucose unit) of from about 3.5 to about 50 or more. Usually the approach of the end point of a reaction is indicated by a decrease in the pressure within the reaction vessel.

Prior to the recovery of the polyether product, the basic catalyst may be optionally neutralized and the volatiles stripped under reduced pressure before or after filtration. Tartaric acid is generally used to neutralize products that can be filtered and where a low ash content is desired, whereas mineral acid is generally used to neutralize products where a higher ash content can be tolerated.

In many instances, it may be advisable, though not necessary, to remove the glycol polyether by-products of this invention by such methods as dialysis or coagulation in hot water. These lower molecular weight materials generally have a higher hydroxyl number than the higher molecular weight fraction. The higher molecular weight starch polyether fraction which is non-dialyzable represents the true starch polyether. The completely hydrolyzed starch polyether is completely dialyzable.

The hydroxyl number of the products can be determined from experimental data. The non-dialyzable fraction of the starch polyethers will have a hydroxyl number equal to or less than 532 when ethylene oxide has been used, equal to or less than 461 when propylene oxide has been used. The hydroxyl numbers of products obtained by reacting butylene oxide and amylene oxide will be even lower.

Molecular weights of the products can be calculated from the observed hydroxyl number, expressed as mg. potassium hydroxide/gram. The hydroxyl number is determined experimentally in terms of the amount of potassium hydroxide (KOH) that is required to back titrate after reacting the product with acetic anhydride. The amount of the KOH used in the titration is conventionally expressed as mgs. of KOH/gram of product. The relative proportions are then determined from the following formula:

$$\text{Hydroxyl No.} = \frac{1000 \times 56.1 \times F}{MW}$$

where:

56.1 represents the GMW of KOH;

1000 is used for the meq. expression;

F is the functionality, that is, the number of hydroxyl groups in the average anhydroglucose unit, which is 3, and MW refers to the molecular weight of the average substituted anhydroglucose unit after reaction with the etherifying reagent.

Since the hydroxyl number is observed experimentally, the MW of an average substituted anhydroglucose unit can be determined by transposition of the values in the formula above. The difference between the molecular weight of an average substituted anhydroglucose unit, of the polyether product, as determined from the formula, and the molecular weight of an unsubstituted anhydroglucose unit (162) represents the amount of the etherifying reagent added, and from this amount, the moles of the etherifying reagent that were reacted per average anhydroglucose unit can be determined. This last figure is the M.S. value.

Since the figures for M.W. and M.S. can be calculated for the crude product, that contains starch polyethers mixed with dialyzable or coagulable by-products, the crude product values are referred to hereafter as "apparent" values.

The invention will now be described in further detail by means of several demonstrations thereof. All references to parts and to percentages are by weight unless expressly stated to be otherwise. All pressures are gauge pressures.

EXAMPLE 1

Starch-propylene oxide reaction

The invention was demonstrated on a laboratory scale in the following manner.

To 285 grams of 80-fluidity starch (containing 12% water) in a 2-liter autoclave were added 200 ml xylene and 9.0 grams of potassium hydroxide (KOH) d.s. (dry substance) as a 50% solution. The reaction kettle was heated to 250° F. (121° C.) and sufficient propylene oxide was added by continuous feed. The reaction temperature was maintained at 250°–275° F. (121° C.–135° C.) and the pressure at 60 psi. After 5 hours the potassium hydroxide was neutralized with tartaric acid, the volatiles were stripped off under reduced pressure, and the product was filtered while hot. A 96% yield was obtained.

The liquid product had a viscosity of 348,000 cps at room temperature and analyzed for 0.2% H$_2$O and 0.4% ash. A hydroxyl number of 383 indicated an apparent molecular weight of 439 per anhydroglucose unit and an apparent M.S. of 4.8, as calculated from the formula.

The product was dialyzed and 76% of the product was shown to be non-dialyzable. Another sample of the total polyether was coagulated in hot water (45°–50° C.) and the coagulated portion was shown to represent 76% of the total product. Both the non-dialyzable portion and the hot water coagulated fraction had a hydroxyl number of 266 indicating molecular weight per anhydroglucose unit of 633 and an M.S. of 8.1. The coagulated fraction was immobile at room temperature but flowed readily on warming. The lower molecular weight material which was removed by dialysis and by hot water coagulation was shown to have a higher hydroxyl number than the higher molecular weight fraction. These by-products appear to be polyoxypropylene glycol polyethers, the glycols being formed by the reaction of propylene oxide with water.

EXAMPLE 2

Starch-propylene oxide reaction—toleration of water—absence of inert reaction medium Following generally the technique of the previous example, 285 grams 80-fluidity starch was mixed with 15.0 grams water, 10 grams KOH d.s. as a 50% solution and 400 grams propylene oxide. The reaction mixture was heated at 225°–250° F. (107° C.–121° C.), and at a pressure of 100 psi, until the initial charge of propylene oxide had reacted. An additional amount of propylene oxide was then added by a continuous feed, with the same conditions of temperature and pressure being maintained throughout the entire reaction period (4½ hours).

The neutralized product was stripped to remove volatiles and filtered while hot (80% yield). The following analysis was obtained: % H$_2$O, 0.7; % volatiles, 0.7; hydroxyl number 340 (apparent M.S.=5.7) (apparent molecular weight per anhydroglucose unit=495). An aqueous solution had a cloud point of 34° C. and was completely coagulated at 50° C. The non-dialyzable portion, 52% of the total product, had a hydroxyl number of 265 (M.S.=8.1) (molecular weight per anhydroglucose unit=635). The non-dialyzable portion was fairly immobile at room temperature but flowed readily on warming.

EXAMPLE 3

Starch-propylene oxide reaction—filtration of product

A 2-liter autoclave was charged with 380 grams 80-fluidity starch, 150 ml-xylene, 11.0 grams KOH d.s. as a 50% solution and sufficient propylene oxide. The reaction mixture was heated at 225°–250° F. and 60 psi for one hour. Additional propylene oxide was added by continuous feed over a 6-hour period and the reaction was continued for one additional hour under the above temperature and pressure conditions. The KOH was then neutralized with tartaric acid and the unreacted propylene oxide was stripped. Xylene (150 ml) was added to the reaction mixture and the diluted solution was filtered. Diluting the reaction mixture greatly increased the ease and the rate of filtration. The filtered product was stripped under reduced pressure to remove the xylene and other volatile by-products. A 99.7% yield was obtained after removing unreacted propylene oxide but before stripping of the xylene.

The product had a hydroxyl number of 379 indicating an apparent M.S. of 4.9 and an apparent molecular weight per anhydroglucose unit of 444. The non-dialyzable fraction had a hydroxyl number of 362 indicating an M.S. of 5.2 and having a molecular weight per anhydroglucose unit of 465. Both the total product and the non-dialyzable fraction flowed with difficulty at 80°–90° C.

EXAMPLE 4

Starch-propylene oxide reaction—use of higher temperatures

A 50-gallon autoclave was charged with sufficient propylene oxide followed by 100 pounds 80-fluidity corn starch (12% H$_2$O) and 3 pounds KOH d.s. as a 56% solution. The reaction mixture was heated at 205°–219° F. (96° C.–104° C.) and a pressure of 82–90 psi for 2 hours. Additional propylene oxide was added by continuous feed over a period of 3½ hours with the temperature maintained at 240°–280° F. (115° C.–138° C.) and a pressure of 35–60 psi. The feed was continued adding propylene oxide over a period of 1 hour at a temperature of 290°–350° F. (143° C.–177° C.) and a pressure of 60–75 psi.

Thirty minutes after the addition of propylene oxide was completed the potassium hydroxide was neutralized with tartaric acid, the volatiles were stripped under a 25-inch vacuum and the product was filtered while hot.

The following analysis was obtained: % $H_2O$=0.1; % ash=0.05; % volatiles=0.41; viscosity=990,000 cps. A hydroxyl number of 363 indicated an apparent M.S. of 5.2 and an apparent molecular weight per anhydroglucose unit of 464. The non-dialyzable fraction (79.2% of the total product) had a hydroxyl number of 275 indicating an M.S. of 7.8, and a molecular weight per anhydroglucose unit of 612. The non-dialyzable fraction flowed readily at elevated temperatures.

EXAMPLE 5

Polyether-propylene oxide reaction

The 50-gallon autoclave was charged with 25 pounds of the starch polyether product of Example 4. To this was added 170 grams KOH d.s. as a 51% solution. The autoclave was flushed with nitrogen and warmed to 170° F. (77° C.). Propylene oxide was added by continuous feed over a period of 17 hours with the temperature and pressure being maintained at 162°–185° F. (72° C.–85° C.) and 30–43 psi respectively. The KOH was neutralized with tartaric acid, the volatiles were stripped, and the product was filtered while hot.

The following analysis was obtained: hydroxyl number 106 (apparent M.S.=24.6) (apparent molecular weight per anhydroglucose unit=1588). The non-dialyzable fraction (80.1% of the total product) had a hydroxyl number of 103 indicating a molecular weight per anhydroglucose unit of 1634 and an M.S. of 25.4. The non-dialyzable portion was fluid at room temperature.

EXAMPLE 6

Starch-propylene oxide reaction—use of glycerin

To 162 grams of 80-fluidity starch (12% $H_2O$) in a 2-liter autoclave were added 92 grams glycerin, 6.5 grams KOH d.s. as a 50% solution and sufficient propylene oxide. The reaction mixture was heated at 260°–280° F., 100 psi for 30 minutes and additional propylene oxide was added in increments over a 2¼ hour period. The above reaction conditions were maintained for the entire run (2¾ hours) and the KOH was neutralized with tartaric acid. The volatiles were stripped and the product was filtered while hot.

Analysis of the product showed 0.6% $H_2O$, 0.6% ash, 0.8% volatiles, 0.8 acid number, viscosity 8,100 cps; hydroxyl number, 310 (apparent M.S.=6.6) (apparent molecular weight per anhydroglucose unit=543). The non-dialyzable portion had a hydroxyl number of 286 indicating an M.S. of 7.3. This fraction flowed readily at an elevated temperature and had a molecular weight per anhydroglucose unit of 588.

EXAMPLE 7

Starch-proplyene oxide reaction—with unmodified corn starch

Unmodified corn starch, 380 grams, was charged into a 2-liter autoclave together with 20 grams water, 15 grams KOH d.s. as a 50% solution and sufficient propylene oxide. The reaction mixture was heated at 270°–300° F., 100 psi for 1½ hours. When the initial reaction was essentially complete, additional propylene oxide was added by continuous feed over a one hour period. After 2½ hours of total reaction time the reaction mixture was stripped to remove volatiles.

Since the product was too viscous to filter, it was dissolved in cold water, neutralized with dilute HCl and coagulated by heating the aqueous solution. Both the total product and the hot water coagulated fraction were immobile at room temperature and flowed with difficulty at 70° C. The total product had a hydroxyl number of 385 (apparent M.S.=4.7) (apparent molecular weight per anhydroglucose unit=437). The non-dialyzable portion constituting 92% of the total product had a hydroxyl number of 374 (M.S.=5.0) (molecular weight per anhydroglucose unit=450).

EXAMPLE 8

Starch-propylene oxide reaction—with 40-fluidity corn starch

In a similar manner, 285 grams of a 40-fluidity corn starch was charged into the autoclave together with sufficient propylene oxide and 10 grams KOH d.s. as a 50% solution. After heating the reaction mixture at 235°–260° F. (113° C.–127° C.), and under 100 psi for 1½ hours, additional propylene oxide was added over a ½ hour period. The reaction mixture was neutralized with tartaric acid, dissolved in cold water, and the product coagulated by heating to 75°–85° C.

The non-dialyzable portion representing 88% of the total product had a hydroxyl number of 397 (M.S.=4.5) (molecular weight per anhydroglucose unit=242). This compares with a hydroxyl number of 423 (apparent M.S.=4.1) for the total product and an apparent molecular weight per anhydroglucose unit of 398. Both the total product and hot water coagulated fraction were immobile at room temperature and flowed with difficulty at 70°–80° C.

EXAMPLE 9

Starch-propylene oxide reaction—with white milo starch

In a similar manner, sufficient propylene oxide was added by continuous feed over a period of 12 hours to a heated mixture of 324 grams white milo starch and 6.5 grams KOH d.s. as a 50% solution. A temperature of 260°–310° F. (127° C.–155° C.), and a pressure of 60–65 psi, were maintained over the entire reaction period. The product was neutralized and the volatiles stripped.

The product was thick and cohesive in nature having a hydroxyl number of 432 (apparent M.S.=3.9) (apparent molecular weight per anhydroglucose unit=390). The product was dialyzed in running water over a 24-hour period. The non-dialyzable portion (89% of the total product) was thick and cohesive and had a hydroxyl number of 317 (M.S.=6.4) (molecular weight per anhydroglucose unit=531). Ten grams of the total product was added to 100 ml of the following solvents.

The following solubility characteristics were observed:

| | |
|---|---|
| Water - room temperature | Completely soluble |
| Water - heated | Product coagulated |
| Chloroform - room temperature | Almost completely soluble |
| Carbon tetrachloride - warm | Completely soluble |

EXAMPLE 10

Starch-ethylene oxide reaction

A 2-liter autoclave was charged with 380 grams of 80-fluidity starch, 9.0 grams KOH d.s. as a 50% solution and 250 ml. xylene. The reaction mixture was heated to 190° F. and ethylene oxide was added by continuous feed over a period of nine hours (pressure maintained at 50–60 psi and temperature at 190°–210° F.). The reaction mixture was neutralized, stripped to remove volatiles and the viscous product was dissolved in water and dialyzed. The non-dialyzable fraction (91.6% of the reaction product) contained 0.45% ash, 3.5% $H_2O$ and had a hydroxyl number of 225 indicating an M.S. of 13.3 (molecular weight per anhydroglucose unit=748).

EXAMPLE 11

Starch-ethylene oxide reaction—subsequent reaction with propylene oxide

The autoclave was charged with 380 grams of 80-fluidity starch, 6.0 grams KOH d.s. as a 50% solution and 350 ml. xylene. Ethylene oxide was added by continuous feed over a period of 18 hours under a pressure of 20–40 psi at a temperature of 180°–220° F. A portion of the product was removed from the autoclave, was neutralized, filtered and stripped to remove volatiles.

The product had a hydroxyl number of 281 (apparent M.S.=9.9) (apparent molecular weight per anhydroglucose unit=600). After dialysis the non-dialyzable portion of the product had a hydroxyl number of 312 (M.S.=8.6) (molecular weight per anhydroglucose unit=539).

The portion remaining in the autoclave was further reacted with propylene oxide at 80 psi and 260° F. for 6 hours. The product was neutralized, filtered and stripped to remove volatiles. It had a hydroxyl number of 221 (apparent molecular weight per anhydroglucose unit=761).

EXAMPLE 12

Starch-propylene oxide reaction—use of aminoethanol

A mixture of 243 grams of 80-fluidity starch (containing 5% $H_2O$) and 92 grams of 2-aminoethanol (1½ moles) was reacted with propylene oxide at 80 psi and 235°–270° F. over a period of 16 hours in the presence of 9.5 grams KOH d.s. as a 50% solution. The reaction mixture was neutralized with tartaric acid, stripped to remove volatiles and filtered. The total product contained 0.2% $H_2O$, 0.08% ash, 1.8% nitrogen, and 0.2% volatiles, and had a viscosity of 66,000 cps and a hydroxyl number of 448.

EXAMPLE 13

Starch-propylene oxide reaction—use of urea

A mixture of 186 grams of 80-fluidity starch and 60 grams (1 mole) urea was reacted with propylene oxide at 100 psi and 250°–270° F. for 4½ hours in the presence of 6.5 grams KOH d.s. as a 50% solution. The product was neutralized with tartaric acid, stripped to remove volatiles and filtered. The product contained 0.1% $H_2O$, 0.05% ash, 2.3% nitrogen, and had a viscosity of 122,000 and a hydroxyl number of 463.

EXAMPLE 14

Hydrolysis of the polyether products

The non-dialyzable fraction of starch polyether of Example 2 was dissolved in a 30% aqueous ethanol solution which was 1.0N with respect to HCl. Two separate portions of the solution were refluxed (86° C.) for periods of 24 and 30 hours respectively.

Samples of the above hydrolyzates were passed over an anion-exchange resin to remove the mineral acid, and were then concentrated to a viscous syrup. The 24-hour sample was observed to be 88% hydrolyzed, and 30-hour sample, 99% hydrolyzed:

| | Example 14a Polyether Specimen Product of Example 2 (Control) | Example 14b 24-Hour Hydrolyzate | Example 14c 30-Hour Hydrolyzate | Theoretical Value for 100% Hydrolyzate |
|---|---|---|---|---|
| Hydroxyl No. | 265 | 380 | 428 | 430 |
| Carbonyl Content, % | 0 | 3.82 | 4.16 | 4.29 |
| Specific Rotation $[\alpha]\frac{25}{D}$, $H_2O$ | +83.1 | +29.0 | +19.6 | — |
| % Hydrolysis | — | 88 | 99 | 100 |

The percent hydrolysis was calculated as follows: A 265 hydroxyl number polyether indicates an M.S. of 8 (8 moles of propylene oxide reacted per average anhydroglucose unit). This corresponds to a molecular weight of the hydrolyzed polyether of 653, a % hydroxyl of 13.2, and a hydroxyl number of 430.

The theoretical carbonyl equivalent is:

$$\frac{28}{653} \times 100 = 4.29$$

The 30-hour hydrolysis product was 100% dialyzable, was mobile, and was readily soluble in water.

Three starch polyether total products were also hydrolyzed, as summarized in the table below, by refluxing at 100° C. for 41–44 hours with dilute hydrochloric acid solutions containing the polyether total products respectively. First, in Example 14d, as indicated below, the hydrolysis product was treated with activated carbon, cation and anion exchange resins prior to concentration. The hydrolysis products of Examples 14e and 14f were treated with activated carbon and anion-exchange resin prior to concentration. All three final products were mobile at room temperature, and were 100% dialyzable.

| Hydrolyzate | Total Starch Polyether Product Used, Hydroxyl No. | Composition of Reaction Medium | Product Hydroxyl No. | Analysis % H$_2$O |
|---|---|---|---|---|
| Example 14d | Total polyether product from Example 7, hydroxyl No. 385 | 100 grams polyether d.s. as a 10% solution + 100 ml conc. HCl | 695 | — |
| Example 14e | Total polyether product from Example 4, hydroxyl No. 363 | 2650 grams polyether + 8-liters 1.0 N HCl | 516 | 0.1 |
| Example 14f | Total polyether product from Example 4, hydroxyl No. 363 | 600 grams polyether + 1.8 liters of 0.5 N HCl | 503 | 0.1 |

Applications—Polyurethane Foams

The starch polyethers and their hydrolysis products are particularly useful in the production of polyurethane foams, as described in the following examples, which are illustrative.

It has been found that certain polyethers are well adapted to certain applications. Starch polyethers and their hydrolysis products having an apparent M.S. from about 3.5 to about 10 are particularly suitable in the production of rigid polyurethane foams; while for flexible foams, the range of apparent M.S. from about 20 to about 50 is preferred.

EXAMPLE 15

Rigid foam including a starch polyether 100 grams of the starch polyether (total product) of Example 4 having an apparent M.S. of 5.2 was preheated to 85° C., and then was blended with 2.0 grams of a silicone oil surfactant, 2.0 grams water 17.0 grams of a fluorocarbon blowing agent. To this blend was added 76.8 grams of an 80/20 mixture of 2,4- and 2,6-tolylene diisocyanate. The reaction mixture was stirred rapidly for 18 seconds, poured into an open mold, and allowed to rise. The foam had a density of 1.75 lbs/cu ft.

EXAMPLE 16

Rigid foam including the hydrolysis product of a starch polyether

A blend was prepared using 100 grams of starch polyether hydrolysis product of Example 14e whose apparent M.S. is 5.4, 2.0 grams of a silicone oil surfactant, 0.7 gram N,N,N',N'-tetramethyl-1,3-butanediamine, 0.2 gram dibutyltin dilaurate and 29 grams of a fluorocarbon blowing agent. To this blend was added 130.5 grams PAPI (polyisocyanate). The reaction mixture was stirred rapidly for 9 seconds, poured into a mold and allowed to rise. The composition had a cream time of 40 seconds and the foam was tack free after 85 seconds. The foam had a density of 2.4 lbs/cu ft. and a compressive strength of 47 psi.

EXAMPLE 17

Flexible foams including starch polyethers

Two flexible foams were prepared using starch polyether (total product) of Example 5, hydroxyl number 106 and apparent M.S. of 24.5. The following formulations were used:

| | FORMULATION (a) | FORMULATION (b) |
|---|---|---|
| Polyether, grams | 100 | 100 |
| Silicone Oil Surfactant, grams | 2.0 | 2.0 |
| Stannous Octoate, grams | 0.2 | 0.25 |
| Triethylenediamine, grams | 0.10 | 0.10 |
| Water, grams | 4.0 | 4.0 |
| 80/20 Mixture of 2,4- and 2,6-tolylene diisocyanate, grams | 58.0 | 58.0 |
| Mix time, seconds | 10 | 11 |
| Cream time, seconds | 20 | 20 |
| Color | white | white |
| Cure | oven cured | oven cured |
| Density, lb/cu ft. | 1.25 | 1.47 |

The procedure followed was to mix the polyether with the silicone oil, triethylenediamine, stannous octoate, and water. The diisocyanate was blended with this mixture, then the blend was stirred rapidly for a few seconds, and poured into an open mold.

Applications—Film Forming

The polyether products may also be employed in combination with epoxy resins, and in combination with polyvinyl alcohol, in the preparation of films and coatings. The following examples are illustrative.

EXAMPLE 18

Epoxy coating containing a polyether

The starch polyether of Example 6 was used in combination with a commercial epoxy resin to give a good coating, useful both on glass and on tin plate.

The following formulation was used:
10.0 grams Dow Epoxy Resin 661 (Bisphenol A epichlorohydrin condensation product having epoxide equivalent of 450–525, molecular weight of 1000 manufactured by Dow Chemical) dissolved in a mixed solvent containing xylene and methyl isobutyl ketone
3.4 grams starch polyether of Example 6
0.45 grams diethylenetriamine catalyst From this formulation, films 3 mils thick were cast on glass and on tin plate, and were oven cured at 150° C. The films were hard, flexible and had good impact resistance (greater than 30 inch-pounds). The films had good resistance to hot water and glacial acetic acid.

EXAMPLE 19

Epoxy coating containing a hydrolysis product of a polyether

The total product of Example 8 was hydrolyzed with 0.5N HCl. The hydrolysis product was then used in the following formulation:
6.0 grams Dow Epoxy Resin 661
2.0 grams VIRCOL-82 (phosphorus polyol containing 2 active hydroxyl groups manufactured by Virginia-Carolina Chemicals Co.)
2.0 grams starch polyether hydrolysis product
6.7 grams solvent (4.5 grams methyl isobutyl ketone+2.2 grams methylethyl ketone)
1.2 grams N,N-dimethylbenzylamine catalyst 3 mil films were cast on both glass and tin plate using this formulation. The films cured in an oven at 150° C. for 15 minutes were clear, hard, flexible (passed the Mandrel flexibility test) and had good impact resistance (greater than 30 inch-pounds). The Mandrel flexibility test is described in the American Society of Testing Materials Standards, ASTM D1737-62.

EXAMPLE 20

Combinations of polyethers with polyvinyl alcohol

The starch polyether of Example 7, both total product and the hot water coagulated fraction, were used in combination with polyvinyl alcohol to prepare films. These polyethers were compatible with polyvinyl alcohol of both low and high molecular weight samples (14,000 M.W., 99% hydrolyzed; 135,000 M.W., 98% hydrolyzed).

| Example 20 | Starch Polyether Example 7 | Ratio of Polyvinyl Alcohol to Starch Polyether | Sodium Borate Added, % of Total d.s. | Solution Stability (hr) | Film Clarity, Distance in mm |
|---|---|---|---|---|---|
| a | Total | 1:1 (135,000 M.W. PVOH) | — | 1 | 50 |
| b | Total | 1:1 (14,000 M.W. PVOH) | 1 | 48 | 9 |
| c | Coagulated | 1:1 (14,000 M.W. PVOH) | 1 | 48 | 10 |
| d | Coagulated | 1:3 (14,000 M.W. PVOH) | 1 | 120 | 7 |
| e | Coagulated | 3:1 (135,000 M.W. PVOH) | — | 1 | 200 |
| f | Coagulated | 3:1 (135,000 M.W. PVOH) | 1 | 48 | 200 |

In the above formulations 5% aqueous solutions were used to cast the films on glass. These were allowed to evaporate to dryness prior to testing.

The solution stability is the time in hours before a test solution separated into two phases.

The films obtained were each characterized by highly desirable properties of homogeneity, clarity, peel, and flexibility.

Applications—General

The polyethers have surface tension values that are attractive for surfactant applications. For example, one polyether total product, produced in accordance with this invention, and having a hydroxyl number of 289 and an apparent M.S. of 7.3, and a viscosity of 51,000 cps, had a surface tension of 41.2 dynes/cm, as a 0.1% solution. A second such polyether total product, having a hydroxyl number of 64 and an apparent M.S. of 42, and a viscosity of 960 cps, had a surface tension of 39.7 dynes/cm, as a 0.1% solution.

Another potential application for the polyethers of this invention is in the formulation of core binders. Typical formulations would include a polyether, a polyisocyanate, a silicone emulsifier, an amine catalyst, and a dibutyltin catalyst. Upon mixing such formulations with sand, in the customary fashion, ramming, and curing, cores can be made that have outstanding tensile and scratch values.

When the reaction mixture, that is used in making the polyether, contains an added material such as, for example, a glycol, aminoethanol, or glycerine, the added material ordinarily will react with the starch to a limited extent, and primarily reacts with the oxide such as the propylene oxide. The total products that are formed in such reactions are particularly useful in the production of polyurethane foams, for example, in assisting in achieving particular desired physical properties in the foams.

On the other hand, when urea and similar nitrogenous materials are present in the reaction mixture, there is a more complete reaction with starch, as well as with the oxide. It is difficult to predict or define what occurs in terms of the chemical structure of the end product. However, the use of such added materials in the reaction mixture does result in useful modifications of the physical and chemical properties of foams that are produced from the polyether products.

In addition, the starch component of the reaction mixture may be mixed with other polyhydroxy starting materials, such as, for example, methyl glucoside, sucrose, and propylene glycol glucoside, or polyethers thereof. The end products are useful, for example, in preparing polyurethane foams with unusual and desirable physical characteristics.

ADDITIONAL EXAMPLES

A few additional examples will now be described, to supplement the foregoing demonstrations of the invention.

EXAMPLE 21

Starch-propylene oxide reaction; high apparent M.S.

To 190 grams of 80-fluidity corn starch in a 2 liter autoclave were added 10 grams water, and 6.5 grams KOH d.s. as a 50% aqueous solution. An initial charge of 190 grams of propylene oxide was then fed into the autoclave at 100 psi. The reaction mixture was heated at 225°–250° F. for one hour.

After the initial reaction was essentially complete, as indicated by a rise in temperature and a drop in pressure, additional propylene oxide (840 grams) was added by continuous feed over a 1½ hour period. The above temperature (225°–250° F.) and pressure (100 psi) were then maintained during the total reaction time of 3½ hours. The potassium hydroxide was neutralized with tartaric acid, the volatiles stripped at 150° C. under reduced pressure, and the product was filtered while hot.

Analysis showed this polyether product (Product 21A) to have 0.8% $H_2O$, 0.0% ash, a viscosity of 51,000 cps, and a hydroxyl number of 289 (indicating an apparent M.S. of 7.3).

This product was soluble in cold water, had a cloud point of 33° C., and was coagulated at 45°–50° C. Fifty-six percent of the product was precipitated in hot water. A similar amount was shown to be non-dialyzable after 24 hours. The water-coagulated fraction had a hydroxyl number of 247 indicating an M.S. of 9. The water-precipitated product was a viscous liquid which flowed readily when warmed.

One hundred fifty-two grams of the crude polyether product was then charged in a 2-liter autoclave along with 6.5 grams KOH d.s. as a 50% aqueous solution and 225 grams propylene oxide. After reacting the initial charge for one hour at 225°–250° F., with the pressure maintained at 100 psi, additional propylene oxide (855 grams) was added by continuous feed over a period of 40 minutes. Thirty minutes after all the propylene oxide had been added, the pressure dropped to 50 psi and the temperature rose to 300° F. The KOH was neutralized with tartaric acid, the volatiles were stripped, and the product was filtered under pressure.

This filtered product had a viscosity of 960 cps and a hydroxyl number of 64 (an apparent M.S. of 42). The product was readily coagulated in hot water.

EXAMPLE 22

Starch-glycerin-propylene oxide reaction, using a minor amount of glycerin by weight of the starch A 2-liter autoclave was charged with 180 grams 80-fluidity starch, 20 grams glycerin, and 6.5 grams KOH d.s. as a 50% aqueous solution. An initial charge of 180 grams of propylene oxide was supplied to the autoclave under 100 psi. The temperature was regulated to about 225° F., and the initial reaction subsided, propylene oxide was supplied to the autoclave on a continuous basis. A total of 1034 grams propylene oxide were thus reacted during a 2½ hour period at 225°–250° F. and 100 psi.

The neutralized, stripped and filtered complex polyether product had a hydroxyl number of 295 (apparent M.S.=7.0) and a viscosity of 96,000 cps. The non-dialyzable portion, representing 56% of the total product, had a hydroxyl number of 247 (M.S.=9.0). The non-dialyzable portion was very viscous at room temperature but flowed readily at an elevated temperature.

EXAMPLE 23

Starch-methyl glucoside-propylene oxide reaction

A 2-liter autoclave was charged with 162 grams of acid-modified, 80-fluidity pearl starch and 194 grams of methyl glucoside. As a catalyst, 6.5 grams of KOH d.s. as a 50% aqueous solution was added. The autoclave was then sealed.

Propylene oxide was then supplied to the autoclave continuously at a temperature in the range from about 190° F. to about 325° F., and at an initial pressure of 100 psi, that was permitted to drop down to about 60 psi during most of the reaction.

After permitting the autoclave to stand for a few hours, the temperature was raised to about 280° F. and the autoclave was placed under vacuum, to strip off volatiles.

The recovery was 1,120 grams of a crude, complex polyether product having a hydroxyl number of 426.

EXAMPLE 24

Starch-propylene glycol glucoside-propylene oxide polyether

The 2-liter autoclave was charged with 240 grams of propylene glycol glucoside, 162 grams of 80-fluidity pearl starch, and 6.5 grams KOH d.s. as a 50% aqueous solution. The autoclave was sealed and heated to a temperature of 217° F. and was maintained in the range from about this temperature up to about 325° F. during the remainder of the reaction.

Propylene oxide (174 grams) was fed into the autoclave until an initial pressure of 100 psi had been achieved. Thereafter, the autoclave was heated and the supply of propylene oxide was then cut off until the initial reaction had subsided and the pressure had dropped to about 62. More propylene oxide was then added to the autoclave, at a gauge pressure of about 60 psi, and this procedure was repeated until a total of about 792 grams of propylene oxide had been added. The pressure was controlled by using cooling coils as necessary.

After the reaction had been carried on for a little over 12 hours, 7.5 grams of tartaric acid were added to the autoclave to neutralize the basic catalyst, and the autoclave was then placed under vacuum to strip off volatiles. The reaction product was then removed from the autoclave and filtered while still at an elevated temperature.

The filtered product was a complex polyether formed by the simultaneous propoxylation of starch and the propylene glycol glucoside.

EXAMPLE 25

Starch-sucrose-propylene oxide polyether

In this example, the 2-liter autoclave was charged with a mixture of 171 grams of sucrose and 162 grams of 80-fluidity pearl starch, together with 6.5 grams KOH d.s. as a 50% aqueous solution.

An initial charge of 174 grams of propylene oxide was fed into the autoclave, and an initial reaction was permitted to occur after heating the autoclave to start the reaction. The autoclave temperature was maintained at about 325° F. throughout the entire reaction by the judicious use of cooling coils. After the initial amount of propylene oxide had been reacted, more propylene oxide was fed into the autoclave and the pressure was maintained in the range from about 60 psi to about 70 psi.

After 1,452 grams of propylene oxide had been reacted, during a reaction period of about 15 hours, 7.5 grams of tartaric acid were added to the autoclave to neutralize the catalyst. The autoclave was then evacuated to strip off volatiles.

The crude complex polyether product recovered from the autoclave weighed 1600 grams before filtration. After filtration, the crude filtered product was found to have a hydroxyl number of 267. The yield of crude filtered product was 89.6% of theoretical.

EXAMPLE 26

Preparation of 2:1 molar % starch-glycerin-propylene oxide polyether

For this demonstration of the invention, the 2-liter autoclave was charged with 62 grams of glycerin, 216 grams of 80-fluidity pearl starch, and 6.5 grams KOH d.s. as a 50% aqueous solution.

The autoclave was heated and continuously stirred. During a period of 4½ hours, propylene oxide was added, the temperature was maintained between 200° F. and 300° F., and the pressure was regulated to a maximum of 115 psi.

At the end of the reaction period, a total of 1184 grams of propylene oxide had been reacted. The reaction mass was neutralized by the addition of 7.5 grams of tartaric acid, and the autoclave was then evacuated and held under vacuum for a short period of time to remove volatiles. The hydroxyl number of the complex polyether reaction mass, as recovered from the autoclave, was 291.

EXAMPLE 27

Preparation of a starch-glycerin-propylene oxide polyether, using a minor proportion of glycerin For this demonstration of the invention, the 2-liter autoclave was charged with 190 grams of 80-fluidity starch, 10 grams of glycerin, and 6.5 grams of KOH d.s. as a 50% aqueous solution. An initial amount of 180 grams of propylene oxide was added to the autoclave, which was then heated. The temperature was then maintained at about 225° F. during the reaction, and the pressure was held at about 100 psi. After the initial reaction subsided, additional increments of propylene oxide were added until a total amount of 1,026 grams had been added, and reacted. At that point, 7.5 grams of tartaric acid were added to the autoclave to neutralize the catalyst.

The autoclave was then evacuated to about 30 inches of mercury at 250° F. to remove volatiles. The final complex polyether product was then filtered and was found to weigh 782 grams, representing a yield of 71% by weight after filtration. The hydroxyl number of the filtered product was 328.

EXAMPLE 28

Preparation of a dextrine-propylene oxide polyether

A 2-liter autoclave was charged with 300 grams of a commercially available, light colored, thin dextrin. Ten grams KOH d.s. as a 50% aqueous solution was added, and the autoclave was sealed. An initial charge of 500 grams of propylene oxide was added to the autoclave, and heat was applied to initiate the reaction.

During this demonstration of the invention, the autoclave pressure was held to about 100 psi and the temperature was maintained in the range from about 225° F. to about 250° F. After the initial reaction had subsided, an additional amount of 451 grams of propylene oxide was added, for a total amount of 951 grams.

About four hours after the addition of propylene oxide had been completed, 11.7 grams of tartaric acid was added to neutralize the catalyst, and the autoclave was evacuated to strip off volatiles. The crude polyether product was then removed from the autoclave and was found to weigh 522 grams. The polyether was filtered hot through a coarse, sintered glass funnel. The filtered product had a hydroxyl number of 415.

EXAMPLE 29

Preparation of a starch-methyl glucoside-propylene oxide polyether

A 2-liter autoclave was charged with 114 grams of white milo starch, 259 grams of methyl glucoside, and 6.5 grams of KOH d.s. as a 50% aqueous solution. Initially, 174 grams of propylene oxide was charged into the autoclave. Heating was then started together with agitation. In a little more than 2 hours, the initial reaction subsided. Thereafter, additional propylene oxide was continuously bled into the autoclave, and the autoclave temperature was maintained in the range from about 260° F. to about 335° F. The autoclave pressure was held at about 64 psi.

With one interruption for an overnight shutdown, the reaction was continued for a total reaction time of about 15½ hours, during which a total amount of 692 grams of propylene oxide was reacted.

After completion of the reaction, tartaric acid in the amount of 7.5 grams was added to neutralize the catalyst, and the autoclave was evacuated and heated for a little more than two hours, to about 300° F., to strip off volatiles. The hot, stripped, complex polyether product was the filtered.

The filtered product was clear. It had a hydroxyl number of 464. The yield was 967 grams.

EXAMPLE 30

Preparation of a starch-methyl glucoside-propylene oxide polyether with a higher ratio of starch to methyl glucoside A 2-liter autoclave was charged with 162 grams of white milo starch, 194 grams of methyl glucoside, and 6.5 grams of KOH d.s. as a 50% aqueous solution. The autoclave was sealed, heat was applied, and the stirrer was placed in operation to agitate the autoclave contents. An initial charge of 174 grams of propylene oxide was added to the autoclave.

After the initial reaction had subsided, propylene oxide was added continuously, while the temperature was maintained in the range from about 250° F. to about 350° F. The pressure generally was maintained in the range from about 60 psi to about 65 psi.

After several hours of reaction, 7.5 grams of tartaric acid was added to neutralize the catalyst, and the autoclave was evacuated and heated to strip off volatiles. The complex polyether product was then filtered while hot. The filtrate was clear and had a hydroxyl number of 375.

EXAMPLE 31

Preparation of a starch-butyl glucoside-propylene oxide polyether

A 2-liter autoclave was charged with 162 grams of an 80-fluidity cornstarch, 236 grams d.b. of butyl glucoside, and 6.5 grams of KOH d.s. as a 50% aqueous solution.

Propylene oxide was added to the autoclave over a period of several hours. The temperature was maintained in the range from about 225° F. to about 330° F., and the pressure was held close to 60 psi but fluctuated in the range from about 50 psi to about 100 psi. A total of 1229 grams of propylene oxide was added to the mixture in the autoclave. When the reaction was complete, 7.5 grams of tartaric acid was added to neutralize the catalyst, and the autoclave was then evacuated to strip off volatiles.

The crude polyether product was filtered while hot, and the filtered product was found to have a hydroxyl number of 307.

EXAMPLE 32

Rigid polyurethane foam prepared from a starch-glycerin-propylene oxide polyether A 100 gram portion of the crude filtered polyether product of Example 6 was mixed together with 2.0 grams of silicone oil surfactant (polysiloxane-polyoxyalkylene surfactant), 0.1 gram of triethylene diamine, 0.2 gram of stannous octoate, and 3.4 grams of water.

To this blend was added 85 grams of an 80/20 mixture of 2,4- and 2,6-tolylene diisocyanate. These components were stirred rapidly for 8 seconds and then poured into an open mold. The cream time was 13 seconds, and the rise time 50 seconds. The foam was placed in an oven for 10 minutes, then allowed to cool and was cut open. The density was 1.58 pounds per cubic foot, the cell structure appeared to be normal, and the compressive strength was 16 psi.

EXAMPLE 33

Polyurethane foam prepared from a starch-water-propylene oxide polyether

To a 100 gram portion of product 21A (from Example 21 hereof) was added 2 grams of a silicone oil, 0.1 gram of an amine catalyst, 0.2 gram of a tin catalyst, 3.4 grams of water and 10 grams of carbon tetrachloride. These ingredients were mixed, and then 82 grams of 2,4- and 2,6-tolylene diisocyanate was added. The mixture was stirred for 10 seconds and then poured into a mold.

The cream time was 24 seconds, and the rise time was 113 seconds. The foam was placed in an air oven to complete the cure. After about 1 hour, the foam was cut open. The cell structure was reasonably uniform. The density of the foam was 1.82 lbs./ft$^3$.

EXAMPLE 34

High density rigid polyurethane foam produced from a starch-water-propylene oxide polyether The crude, filtered polyether product of Example 4 was used in the preparation of a polyurethane foam.

A 100 gram portion of the starch polyether was preheated to 50° C. and then blended with 2.0 grams of a silicone emulsifier, 0.4 gram dimethylaminoethanol and 30 grams of fluorocarbon blowing agent. After mixing, 89.3 grams of polyethylene polyphyenyl isocyanate (PAPI) was added. The reaction mixture was then stirred for 45 seconds, and then poured into an open mold. After curing, the foam had a density of 17.36 and had high compressive strength.

Generally similar high densities were obtained when foams were prepared from the same polyether utilizing an 80/20 mixture of 2,4- and 2,6-tolylene diisocyanate. In addition, a slightly denser foam was obtained when the tolylene diisocyanate-reacted foam was prepared without the use of a catalyst.

EXAMPLE 35

Foundry binder applications for starch-base polyethers

The starch polyethers prepared in accordance with the present invention are generally useful in the preparation of reaction products with polyisocyanates. These reaction products are useful in a wide variety of applications, particularly in the preparation of core binders of the kind used in the foundry industry.

To demonstrate this aspect of the invention, the filtered starch-glycerin-propylene oxide polyether of Example 22 was used to prepare a core binder. The binder was formulated from the following:

| Component | Parts by weight based on 100 pts of sand |
|---|---|
| Filtered polyether of Example 22 | 2.9 |
| PAPI (polymethylene polyphenylene polyisocyanate) | 2.1 |
| Silicone emulsifier | 0.02 |
| TMBD (amine catalyst) | 0.01 |
| Dibutyltin dilaurate | 0.02 |

The polyether, polyisocyanate, silicone and about 95% of the core sand were mixed together. The remaining portion of the sand was mixed with the amine and tin catalysts. The two portions were then blended together, poured into the mold at room temperature, and packed by ramming. The mold was transferred to a baking pan and cured for 30 minutes at 425° F. in a forced air oven.

This core, and others produced in a similar manner, had good green strength and outstanding tensile and scratch values. The particular core, whose preparation had just been described, had a tensile test value of 620 psi, and a scratch value of 98.

CONCLUDING COMMENTS

In addition to being concerned with the new polyethers of starch, their hydrolysis products, and methods for producing them, this invention is also concerned with polyethers that are prepared from mixtures of starch, as that word has been previously defined, with other polyols. These other polyols have two or more hydroxyl groups and two or more carbon atoms.

One preferred class of polyols, for admixture with starch, includes the saturated aliphatic polyols having from 3 to 6 carbon atoms and from 3 to 6 hydroxyl groups. Glycerin is an especially preferred polyol of this class. However, mixtures of aliphatic polyalcohols are also useful.

It is convenient to refer to the proportions of starch to the other polyol material in terms of weight percentage based on 100 parts by weight of the mixture of starch with the other polyol material. The precise amount of the other polyol material, that is employed, will depend upon the properties desired in the polyether product, or, if the polyether is to be employed in the formulation of a polyurethane foam, the properties that are desired in the foam will govern.

One preferred starch-polyol mixture, for use in the production of polyethers, is the family of starch-glycerin mixtures, in which the amount of glycerin in the mixture falls in the range from about 5% to about 95%, based on the total weight of the mixture.

Another preferred group of starch-polyol mixtures, using a second preferred class of polyols, for use in the manufacture of polyethers for the production of polyurethane foams, in particular, is the family of mixtures of starch with the lower alkyl glucosides, particularly, methyl glucoside. As was the case with glycerin, the lower alkyl glucoside may be employed in amounts in the range from about 5% by weight to about 95% by weight of the glucoside, based on the total weight of the starch-glucoside mixture. Similarly, the hydroxy derivatives of the lower alkyl glucosides may also be used, as Example 24, above, demonstrates, in the same proportions with respect to starch as for lower alkyl glucosides, that is, from about 5% to about 95% by weight based on the glucoside-starch mixture.

Still another preferred family of mixtures, particularly for the production of polyethers useful in the formulation of rigid polyurethane foams, is the family of starch-sucrose mixtures. Useful mixtures of starch with sucrose include those where the sucrose constitutes from 5% by weight to about 95% by weight of the starch-sucrose mixture.

Similarly, the other polyol material that is mixed with starch may itself be a mixture of polyols. For example, a mixture of starch, propylene glycol, and glycerin produces interesting and useful polyethers. Similarly, mixtures of starch, glycerin and methyl glucoside, when alkoxyalkylated, produce polyethers that are useful in the production of polyurethane foams.

Other useful polyol materials, that can be admixed with starch, include erythritol, sorbitol, mannitol, pentaerythritol, 1,2,6-hexanetriol, diglycerol, trimethylolethane, trimethylolpropane, trimethylolamine and triisopropanolamine. More than one of these polyols may be mixed with starch for the production of polyethers. Useful mixture proportions are those based on from 5% to 95% of starch by weight of the mixture.

In the process of preparing the polyethers of the present invention, the reaction preferably is conducted by placing in a sealable vessel the mixture of the starch material, the other polyol material, and the catalyst, and then adding to the vessel only a portion of the epoxide. The formation of the polyether is initiated by heating the vessel and its contents. Since the reaction is exothermic, the temperature is regulated by the use of cooling coils. When the initial reaction has subsided, additional amounts of the epoxide can be added in increments or on a continuous basis, whichever is the more convenient. In the demonstrations of the invention described in detail above, the epoxide commonly used, except for Example 10, was propylene oxide. It is convenient to handle. However, as Example 10 demonstrates, ethylene oxide can be employed with equally good results. In addition, polyethers have been successfully produced, in accordance with the present invention, and following the techniques described above, utilizing other alkylene oxides. Exemplary alkylene oxides include those that fall within the family of alkylene oxides having from 2 to 5 carbon atoms, including mixtures of epoxides. Also, one epoxide can be added initially, and another epoxide later, to produce unique polyethers.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A polyether polyol consisting essentially of
   (1) an oxyalkylated polyalcohol which is the reaction product of
      (a) a polyhydroxy compound selected from the group consisting of glycols, glycerin, methyl glucoside, propylene glycol glucoside, sucrose and polyethers thereof, and
      (b) a lower aliphatic alkylene oxide, and
   (2) an oxyalkylated polysaccharide of the general formula:

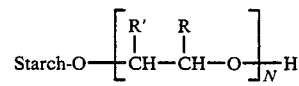

where N has a value in the range from about 3.5 to about 50, per average anhydroglucose unit, and R and R' are of the class consisting of H, $CH_3-$, $C_2H_5-$, and $C_3H_7$.

2. A polyether polyol according to claim 1 in which said Starch is derived from a polysaccharide which is soluble or partially soluble in water.

3. A polyether polyol according to claim 1 in which said oxyalkylated polyalcohol is derived from a saturated aliphatic polyalcohol having three carbon atoms and three hydroxyl groups and said Starch is derived from a dextrin.

4. A polyether polyol according to claim 1 in which R is methyl and R' is hydrogen and said lower aliphatic alkylene oxide is propylene oxide.

5. The polyether polyol according to claim 3 in which R is methyl and R' is hydrogen and said compound containing a reactive lower aliphatic alkylene oxide group therein is propylene oxide.

6. The polyether polyol according to claim 3 in which said Starch is derived from a soluble or partially soluble dextrin.

7. A polyether polyol according to claim 1 in which said oxyalkylated polyalcohol is derived from a saturated aliphatic polyalcohol having three carbon atoms and three hydroxyl groups and said Starch is derived from unmodified starch.

8. A polyether according to claim 7 in which R is methyl and R' is hydrogen and said lower aliphatic alkylene oxide is propylene oxide.

9. A polyether polyol according to claim 8 in which said Starch is derived from corn starch.

10. A polyether polyol according to claim 9 in which said Starch is derived from potato starch.

11. A polyether polyol according to claim 9 in which said Starch is derived from wheat starch.

* * * * *